(12) United States Patent
Ott et al.

(10) Patent No.: US 10,036,632 B2
(45) Date of Patent: Jul. 31, 2018

(54) SYSTEM TO PERFORM RADIO FREQUENCY INTERFEROMETRY USING OPTICAL FIBER SENSING SIGNAL PROCESSING TECHNIQUES

(71) Applicant: The United States of America, as represented by the Administrator of the National Aeronautics and Space Administration, Washington, DC (US)

(72) Inventors: Melanie N. Ott, Columbia, MD (US); William J. Thomes, The Villages, FL (US); Eleanya E. Onuma, Greenbelt, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/356,996

(22) Filed: Nov. 21, 2016

(65) Prior Publication Data
US 2018/0143014 A1 May 24, 2018

(51) Int. Cl.
*G01S 13/00* (2006.01)
*G01B 15/04* (2006.01)
*G01B 9/02* (2006.01)

(52) U.S. Cl.
CPC ......... *G01B 15/04* (2013.01); *G01B 9/02002* (2013.01)

(58) Field of Classification Search
CPC ................................. G01S 13/00; G01S 17/00
See application file for complete search history.

(56) References Cited

U.S. PATENT DOCUMENTS

| | | | | |
|---|---|---|---|---|
| 5,005,946 A | * | 4/1991 | Brandstetter | G01R 23/17 359/15 |
| 5,247,309 A | * | 9/1993 | Reich | G01S 7/032 342/175 |
| 5,450,223 A | * | 9/1995 | Wagner | H04Q 11/0003 398/1 |

* cited by examiner

*Primary Examiner* — Jonathan Hansen
(74) *Attorney, Agent, or Firm* — Christopher O. Edwards; Bryan A. Geurts; Mark P. Dvorscak

(57) ABSTRACT

Aspects of the present disclosure involve a system and method for performing radio frequency interferometry using optical fiber sensing. Optical fiber sensing is performed as a reference signal is defined and compared, in the optical domain, to incoming signals to obtain interference fringe patterns that can be used to decode phase shift offsets with respect to the designated reference signal. The phase shift offsets can be determined by first optically modulating the reference and incoming signals using a laser source as the carrier. In the optical domain, the reference and incoming signals are combined using an optical coupler and then converted back to the electrical domain for processing.

18 Claims, 3 Drawing Sheets

US 10,036,632 B2

SYSTEM TO PERFORM RADIO FREQUENCY INTERFEROMETRY USING OPTICAL FIBER SENSING SIGNAL PROCESSING TECHNIQUES

TECHNICAL FIELD

This disclosure relates generally to radio frequency interferometry, and more specifically to a method for performing radio frequency interferometry using optical fiber sensing.

BACKGROUND

Interferometry is an exploratory technique that is used for making measurements and extracting information from waves that have been superimposed. The information extracted from the waves can have many uses, including the ability to map surfaces, determine the separation of binary stars, and determine the shape of an object from a distance. To determine the shape of an object from a distance, interferometry is used to make phase-based measurements that can be cross-correlated to determine scene visibilities and shapes. Generally, radio frequency (RF) components are used for such phase monitoring. However, RF components often require sophisticated packaging and can generate substantial heat. The heat dissipated from the RF components can create instability in the phase measurements, resulting in unreliable measurements and making high resolution interferometry detection improvable over large bandwidths.

BRIEF SUMMARY

The present disclosure is directed to an apparatus and methods for performing radio frequency interferometry using optical fiber sensing. The method can include receiving radio frequency signals, wherein at least one of the radio frequency signals is selected as a reference signal. The method can further include optically modulating the received radio frequency signals and the reference signal to yield modulated optical signals, wherein the received radio frequency signals and the reference signal are optically modulated using a laser beam from a laser source. The method can also include optically combining the modulated optical signals to generate fringe patterns and interrogating the fringe patterns to determine corresponding phase offsets between the reference signal and the received radio frequency signals.

The apparatus can include a plurality of antennas configured to receive radio frequency signals, wherein at least one of the radio frequency signals is selected as a reference signal. The apparatus can also include an optical modulator configured to optically modulate the received radio frequency signals and the reference signal to yield modulated optical signals, wherein the received radio frequency signals and the reference signal are optically modulated using a laser beam from a laser source. The apparatus can include a coupler configured to optically combine the modulated optical signals to generate fringe patterns. The apparatus can also include a processing electronics module configured to interrogate the fringe patterns to determine corresponding phase offsets between the reference signal and the received radio frequency signals.

Another method can include receiving radio frequency signals for detecting a size of an object. The method can include modulating the laser beam with the radio frequency signals to yield modulated optical signals. The method can also include comparing each of the optical signals with at least one of the optical signals to generate fringe patterns. The method can further include determining a phase shift between each of the optical signals and the at least one of the optical signals based on the fringe patterns and analyzing the fringe patterns to determine the size of the object.

BRIEF DESCRIPTION OF THE DRAWINGS

The description will be more fully understood with reference to the following figures and charts, which are presented as various embodiments of the disclosure and should not be construed as a complete recitation of the scope of the disclosure, wherein.

DETAILED DESCRIPTION

Aspects of the present disclosure involve systems, methods, devices, and the like for performing radio frequency interferometry using optical fiber sensing. In one aspect, a reference signal is defined and compared, in the optical domain, to incoming signals to obtain interference fringe patterns that can be used to decode phase shift offsets with respect to the designated reference signal. The phase shift offsets can be determined by first optically modulating the reference and incoming signals using a laser beam as the carrier. In the optical domain, the reference and incoming signals are combined using an optical coupler and then converted back to the electrical domain for processing.

Figure 1:
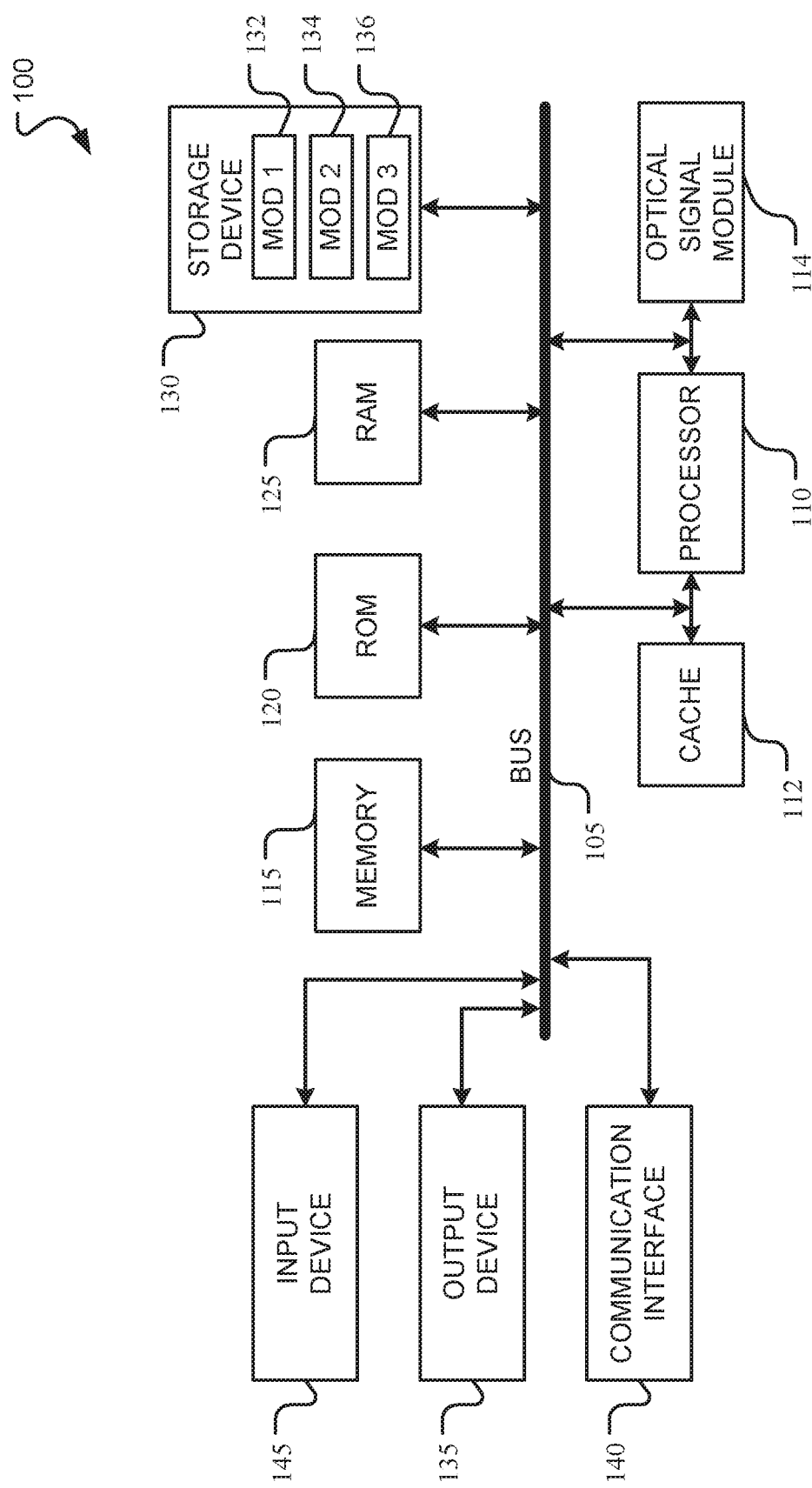
FIG. 1 is a diagram illustrating an example system architecture.

FIG. 1 is a diagram of an architecture 100 for performing radio frequency interferometry. Conventionally, radio interferometry architectures include radio frequency components which can be high powered, components. The components can generate noise and heat which can lead to unreliable/unstable measurements. To overcome the heat and instability, optical components are introduced which provide better signal stability at a higher range of frequencies.

FIG. 1 introduces the general architectural components for a system that can be used in performing radio frequency interferometry using fiber optic sensing. FIG. 1 discloses some basic hardware components that can apply to system examples of the present disclosure. An exemplary system and/or computing device 100 is introduced that includes a processing unit (CPU or processor) 110 and a system bus 105 that couples various system components including the system memory 115, read only memory (ROM) 120, and random access memory (RAM) 125 to the processor 110. The system 100 can include a cache 112 of high-speed memory connected directly with, in close proximity to, or integrated as part of the processor 110. The system 100 copies data from the memory 115/120/125 and/or the storage device 130 to the cache 112 for quick access by the processor 110. In this way, the cache provides a performance boost that avoids processor 110 delays while waiting for data. These and other modules can control or be configured to control the processor 110 to perform various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, or standalone optical signal module 114 configured to control the processor 110 as well as a special-purpose processor where software instructions are incorporated into the processor. The processor 110 may be a self-contained computing system, containing multiple cores or processors, a bus, a memory controller, a cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or the cache 112, or can operate using independent resources. The processor 110 can include one or more of a state machine, an application specific integrated circuit (ASIC), or a programmable gate array (PGA) including a field PGA.

The system bus 105 may be any of several types of bus structures, including a memory bus or memory controller, a peripheral bus, and a local bus using any of a variety of bus architectures. A basic input/output (BIOS) stored in ROM 120 or the like may provide basic routine that helps to transfer information between elements within the computing device 100, such as during start-up. The computing device 100 further includes storage devices 130 or computer-readable storage media such as a hard disk drive, a magnetic disk drive, an optical disk drive, a tape drive, a solid-state drive, a RAM drive, a removable storage devices, a redundant array of inexpensive disks (RAID), a hybrid storage device, or the like. The storage device 130 is connected to the system bus 105 by a drive interface. The drives and the associated computer-readable storage devices provide non-volatile storage of computer-readable instructions, data structures, program modules, and other data for the computing device 100. In one aspect, a hardware module that performs a particular function includes the software component stored in a tangible computer-readable storage device in connection with the necessary hardware components, such as the processor 110, bus 105, display (or any output device) 135, and so forth, to carry out a particular function. In another aspect, the system can use a processor and a computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 110 executes instructions to perform "operations", the processor 110 can perform the operations directly and/or facilitate, direct, or cooperate with another device or component to perform the operations.

Although the exemplary embodiment(s) described herein employs the hard disk 130, other types of computer-readable storage devices which can store data that are accessible by a computer, such as magnetic cassettes, flash memory cards, digital versatile disks (DVDs), cartridges, random access memories (RAMs) 125, read only memory (ROM) 120, a cable containing a bit stream and the like, may also be used in the exemplary operating environment. According to this disclosure, tangible computer-readable storage media, computer-readable storage devices, computer-readable storage media, and computer-readable memory devices expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, a keyboard, a mouse, a motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement, and therefore the basic hardware depicted may easily be substituted for improved hardware or firmware arrangements as they are developed.

For clarity of explanation, the illustrative system embodiment is presented as including individual functional blocks, including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example, the functions of one or more processors presented in FIG. 1 can be provided by a single shared processor or multiple processors (use of the term "processor" should not be construed to refer exclusively to hardware capable of executing software). Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer; (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates four modules: Mod1 132, Mod2 134, Mod3 136, and optical signal module 114, which are configured to control the processor 110. These modules may be stored on the storage device 130 and loaded into RAM 125 or memory 115 at runtime or may be stored in other computer-readable memory locations. Alternatively, these modules may standalone (e.g., optical signal module 114) for controlling the optical signal processing.

Optical signal module 114 can use the computing device 100 of FIG. 1 or similar computer components to perform radio frequency interferometry using optical fiber sensing.

Optical signal module 114 can be one or more components as disclosed below and in conjunction with FIG. 2 for performing optical modulation. For example, optical signal module 114 can include a laser source, an optical modulator, stability control components, couplers, converts, and the like for performing optical sensing. Additionally or alternatively, optical signal module 114 can process or work jointly with processor 110 for interrogating phase offsets obtained from the fringe patterns output from the couplers.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and the underlying hardware necessary to execute the virtualization layer. The system 100 can include a physical or virtual processor 110 that receives instructions stored in a computer-readable storage device, which cause the processor 110 to perform certain operations. When referring to a virtual processor 110, the system also includes the underlying physical hardware executing the virtual processor 110.

In some embodiments, the core processing unit in the system can be the Goddard Space Flight Center (GSFC)-developed SpaceCube, a hybrid computing platform designed to provide command and data handling functions for earth-orbiting satellites. The SpaceCube includes five slices (cards): two Power Slices, two Processor Slices, and one Video Control Module (VCM) Slice. Other configurations are contemplated as well. Each processor slice contains two Xilinx Virtex 4 Field Programmable Gate Arrays (FPGAs), and each FPGA contains two PPC405 processors running at 250 MHz. These eight processors host multiple instantiations of the system pose application FPose, along with command and telemetry handling software that allows a flight-like ground terminal to control the system remotely. The VCM provides sensor data compression and 16 Gb of flash memory to store raw sensor images for later playback. The Argon SpaceCube is an engineering development unit (EDU) version of the hardware on the (Relative Navigation Sensor) RNS experiment and Materials International Space Station Experiment.

As indicated, FIG. 1 introduces the general architectural components and specifically the use of optical signal module 114 for performing radio frequency interferometry using fiber optic sensing. FIG. 2 discloses a block diagram of a system 200 for performing such sensing. In some instances, optical signal module 114 can perform some or all of the optical sensing and processing functions/operations described herein. For example, in one embodiment, system 200 can receive RF signals and converted them into optical signals to compare against a reference signal to obtain the phase measurements that enable the shape of an object at a distance to be determined.

Figure 2:
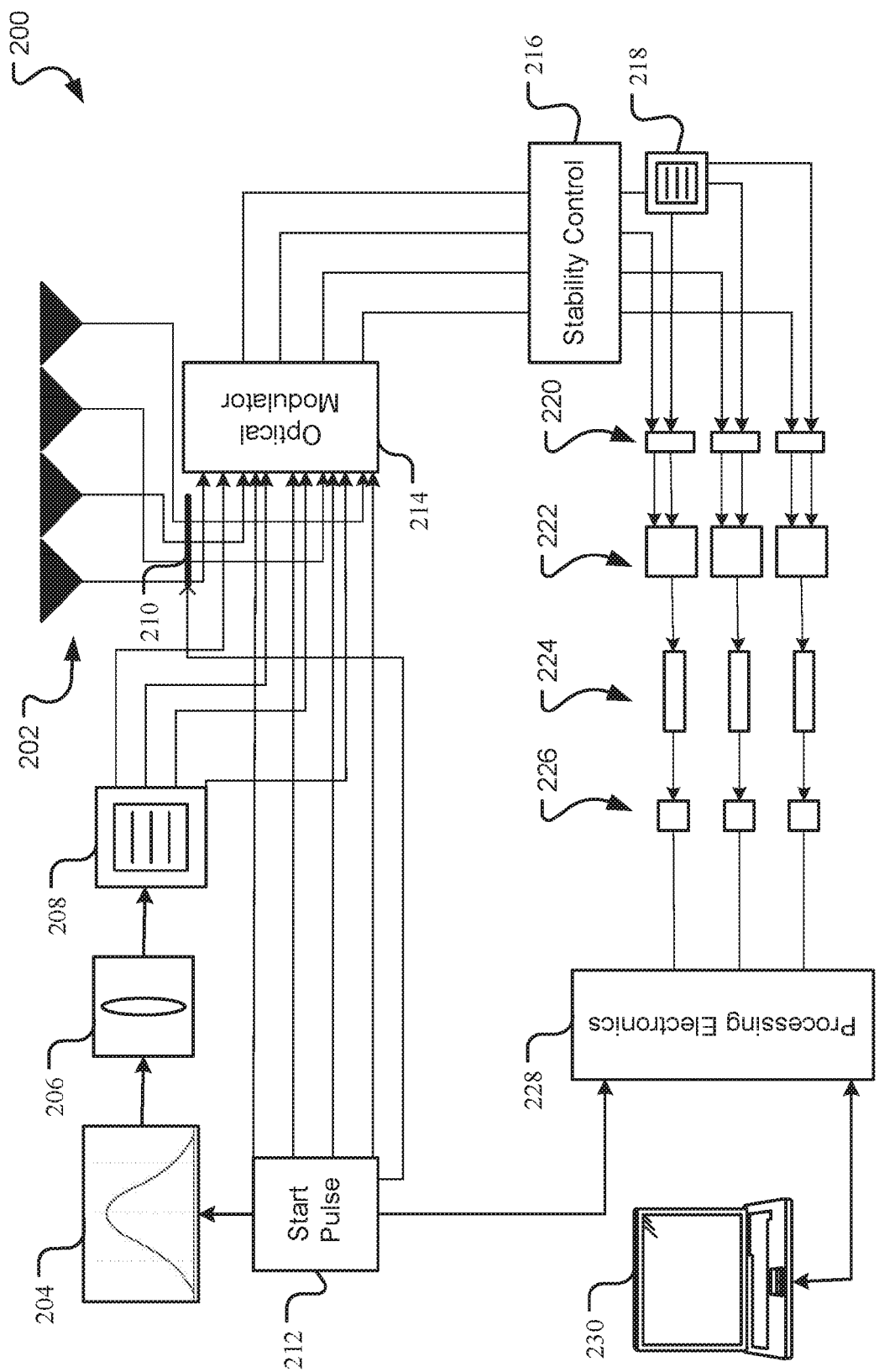
FIG. 2 is a block diagram illustrating a system for performing radio frequency interferometry using optical fiber sensing.

In FIG. 2, RF signals arrive at one or more antennas 202 which can derive from one or more sources of interest. As indicated, RF components are noisy, large, and susceptible to heat dissipation. Therefore, optical processing is introduced herein to overcome some of the deficiencies of RF components. Optical sensing begins with the use of a laser source 204 as the mechanism for converting the RF signals received from the antennas 202 into optical signals. The laser source 204 can generate a beam that is polarized and distributed according to the system requirements. For example, the laser source 204 can generate a linearly polarized single mode Gaussian beam with a 1550 nm wavelength. The optical source (e.g., laser source 204) when modulated with the RF signals allows coherent interference to render the phase difference of each of the incoming RF signals.

Following the laser source 204, a phase stabilizer 206 may be added to function as an optical isolator to the laser source 204. Because phase variations are the information carrying measures, a phase stabilizer 206 may be adequately added to system 200 to minimize phase instabilities. That is to say, a phase stabilizer 206 may be added to maintain the phase intensity of the laser beam stable.

In order to efficiently convert the RF signals, the beam from the laser source 204 may be split to correspond with the number of incoming signals. Thus, the beam can be processed through a splitter 208 and fed to an optical modulator 214 in preparation for the RF to optical conversion of the incoming signals. In one embodiment, the splitter 208 is designed to maintain polarization coherency. Although not shown, other components may be added that can provide added stability in phase and polarization of the laser beam.

Like the laser beam, the input RF signals received at the antennas are fed into the optical modulator 214. The optical modulator 214 is the component in system 200 that can perform the conversion of the RF signals into optical signals. To do so, an incoming RF signal is used to phase modulate the beam, thereby using the beam as the carrier for the frequency and phase information. When this carrier is mixed coherently using optical interferometry techniques, the phase information is preserved without the use of high power, high heat dissipative RF components. In some instances, the RF signals may be conditioned by RF signal conditioning component 210 to ensure the signals meets the requirements of the optical modulator 214. Signal conditioning can generally include the manipulation of an analog signal (e.g., input RF signals) in preparation for the next stage of signal processing. Manipulation of the signal can include, but is not limited to, amplification, filtering, range matching, isolation, and the like. The conditioned input RF signals can then be input to the optical modulator 214, to obtain optically modulated signals. In some instances, the optical modulator can have an operational frequency range up to 3 GHz or greater.

An important aspect in optical interferometry is the use of a reference signal for phase-based measurement correlation with the input signals. The reference signal can be one or more signals that may be used as a baseline for comparing other incoming RF signals. For example, a platform in space may include numerous antennas located about the platform. One of the antennas can be used as the reference, where the incoming signal from that reference is designated the reference signal. Signals arriving from the other antennas can be compared against the reference signal for phase-based measurements and correlation. Note that although an incoming RF signal is used for the reference signal, the reference signal is not so limited and may be more than one incoming RF signal, a standalone signal (e.g., laser source), an onboard stable clock, etc.

In system 200, for example, the reference signal is selected from one of the incoming input RF signals and used in the comparison. Once selected, the reference signal can be fed into a splitter 218 to enable the comparison of the reference signal with each of the incoming signals. As an example, illustrated in system 200 of FIG. 2, is the use of the signal deriving from the rightmost antenna as the reference signal. Again, because stability is an important aspect in system 200, the converted optical signals can be processed by a stability control module 216 prior to the splitter for thermal/phase compensation and signal level control. Additionally or alternatively, the optical signals can be further processed for control and stability using a variable optical attenuator 220. The variable optical attenuator 220 can function to provide balanced signal levels. Additionally, the variable optical attenuator 220 can control the intensity of the optical signals to ensure a maximum dynamic range is provided and noise is mitigated.

Once the optical signals have been balanced and stabilized, and the reference signal has been selected, the signals arrive at coupler 222, where the reference and the input signals are compared. That is to say, the coherent optical signals are combined in order to obtain the sum difference. In combining the optical signals (optically modulated signals), interference fringes can be observed based on the phase differences of the incoming RF signals. The interference can be constructive or destructive interference. Interference can generally be defined as the superposition of two or more waves resulting in a wave with greater or smaller amplitude.

Once the signals have been mixed together, the fringes are interpolated to determine if, for example, the object being detected is moving toward or away from a reference location. To determine this, the interference fringes are turned back into electrical signals for processing. The conversion of the signals can occur using an optical to electrical (O/E) converter 224. In one example, the O/E converter 224 may be an optical converter, however varying types of converters may be used base the stability and precision needed by the application.

Output from the O/E converters 224, the electrical signals can each navigate through a low pass filter 226 to focus the signals at the lower frequencies. Since slow varying changes are occurring a low pass filter can be used to understand the changes in the incoming RF signals in comparison with reference signal(s). In the comparison, phase shift can be resolved from each transmission as compared to the reference signal. The offsets can be analyzed using a processing electronics module 228. The processing electronics module 228 can be used to resolve the phase shift for each of the incoming signals over a range of specified frequencies. Thus, the system can interrogate the resulting interference fringe patterns (electrical signals) to decode the phase shift versus that of the reference phase of the source. Over time, the processing electronics module 228, in conjunction with a computing system 230, can use this information to establish the phase in the RF domain of each source with respect to the designated reference.

Note that in order to ensure that the processing electronics are synchronized to the incoming signals, a start pulse timer 212 can also be used to trigger both a reference time for the laser source 204 and the processing electronics module 228. For example, at a specific time interval as designated by the system response, all inputs will choose a frequency at which to transmit during the same time interval and a clock (e.g., start pulse timer 212) will be used to synchronize the system to respond appropriately during a designated time slot.

Figure 3:
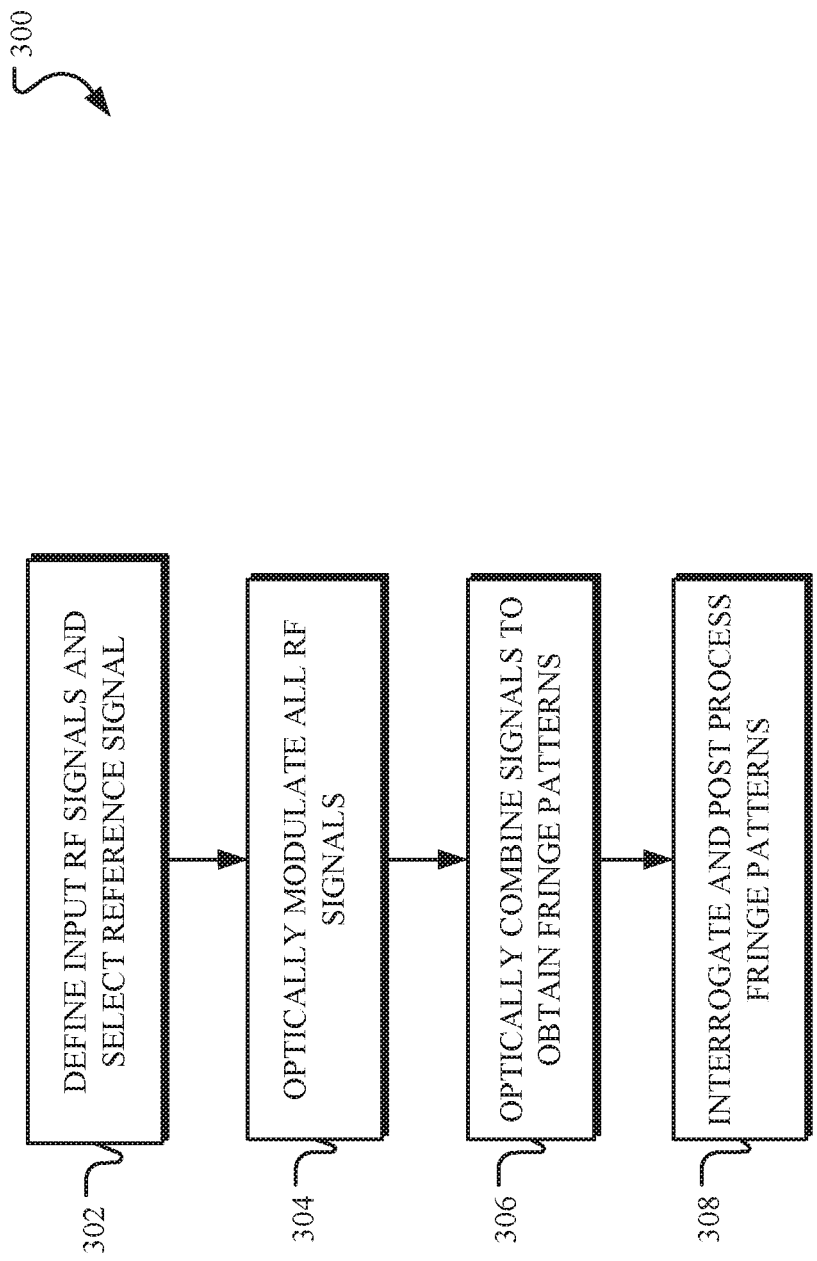
FIG. 3 is a flow chart of a method for performing radio frequency interferometry using optical fiber sensing.

FIG. 3 is a flowchart of the various operations of the presently disclosed technology. Specifically, FIG. 3 is a flow chart of a method 300 for performing radio frequency interferometry using optical fiber sensing. Method 300 begins with operation 302, where input RF signals are received, defined, and a reference signal is selected. As previously indicated, the input RF signals can arrive from an array of antennas transmitted by one or more remote objects whose phase characteristics will be used in radio wave interferometry. The reference signal can be selected from one of the input RF signals, several of the input RF signals, or from a standalone source. In one embodiment, the antenna array for receiving the input RF signals can be operational between 900 MHz-1 GHz. However, incoming signals arriving at other frequency ranges including, but not limited to the KA—band, can be detected and optically processed.

Once the reference signal has been selected, method 300 continues to operation 304, where the RF signals are converted into optical signals for processing. RF to optical conversion can occur using an optical phase modulator. In phase modulation, an incoming input RF signal is used to phase modulate a beam, thereby using the beam as the carrier for the frequency and phase information. In one example, the incoming RF signals are phase modulated into optical signals using a laser beam. In addition, the pulse and/or the optical signals can be stabilized and/or controlled to ensure thermal/phase levels and signal levels are adequately manipulated for the next stage of the signal processing.

In operation 306, the reference signal and each of the optical signals are optically combined to obtain fringe patterns. In order to combine the reference signal with each of the optical signals, the reference signal may be processed through a splitter, as previously described. Once the reference signal is combined, the fringe patterns (demonstrating constructive or destructive interference) can be interrogated and post-processed can occur in operation 408.

Since the fringe patterns are optical signals, an O/E converter may be used to convert the optical signals to electrical signals. In addition, a variable optical attenuator may be used to balance the signal levels to provide maximum dynamic range and a LPF may be used to filter out and enable the comparison of the low frequency, slow varying changes. The interrogation and post processing can occur on a processing electronics module and/or computing system (e.g., computer system 100 of FIG. 1 above) where the offsets in two different phases can be analyzed.

As indicated, the phase measurements can then be used for determining the shape of an object at a distance. Alternatively, the phase measurements can be used in other space applications including, but not limited to, mapping surfaces, performing remote sensing, and determining the separation of binary stars. In addition, optical modulation can be used for calibrating systems, in beamforming multiple-input multiple-output (MIMO) applications, in cellular telephony, airport traffic control, etc.

Note that the optical modulation scheme presented in FIGS. 2-3 is a possible example for performing radio frequency interferometry using optical fiber sensing that may be employed or be configured in accordance with aspects of the present disclosure. It will be appreciated that other configurations may be utilized.

In the present disclosure, the methods disclosed may be implemented as sets of instructions in hardware or software. It may be further understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
receiving radio frequency signals, wherein at least one of the radio frequency signals is selected as a reference signal;
optically modulating the received radio frequency signals and the reference signal to yield modulated optical signals, wherein the received radio frequency signals and the reference signal are optically modulated using a laser beam from a laser source;
optically combining the modulated optical signals to generate fringe patterns;
interrogating the fringe patterns to determine corresponding phase offsets between the reference signal and the received radio frequency signals; and
synchronizing the laser source with processing electronics to ensure the processing electronics are synchronized to the received radio frequency signals for interrogating the fringed patterns.

2. The method of claim 1, further comprising:
stabilizing the modulated optical signals for phase compensation and signal level control.

3. The method of claim 1, further comprising:
attenuating the modulated optical signals to obtain balanced signal levels.

4. The method of claim 1, further comprising:
converting the fringe patterns to electrical signals.

5. The method of claim 4, further comprising:
filtering the electrical signals to maintain lower frequency changes.

6. The method of claim 4, wherein the interrogated fringe patterns are the converted electrical signals.

7. The method of claim 1, wherein phase offsets between the reference signal and the received radio frequency signals provide information about a shape of an object.

8. The method of claim 1, wherein the laser source generates a linearly polarized laser beam.

9. The method of claim 1, wherein the laser beam is isolated to minimize phase instabilities in the laser beam.

10. A system comprising:
a plurality of antennas, the plurality of antennas configured to:
receive radio frequency signals, wherein at least one of the radio frequency signals is selected as a reference signal;
an optical modulator, the optical modulator configured to:
optically modulate the received radio frequency signals and the reference signal to yield modulated optical signals, wherein the received radio frequency signals and the reference signal are optically modulated using a laser beam from a laser source;
a coupler, the coupler configured to:
optically combine the modulated optical signals to generate fringe patterns;
a processing electronics module, the processing electronics module configured to:
interrogate the fringe patterns to determine corresponding phase offsets between the reference signal and the received radio frequency signals; and
a start pulse timer, the start pulse timer configured to synchronize the laser source with the processing electronics module to ensure the processing electronics module is synchronized to the received radio frequency signals for interrogating the fringed patterns.

11. The system of claim 10, further comprising:
a stability controller, the stability controller configured to:
stabilize the modulated optical signals for phase compensation and signal level control.

12. The system of claim 10, further comprising:
an optical attenuator, the optical attenuator configured to:
attenuate the modulated optical signals to obtain balanced signal levels.

13. The system of claim 10, further comprising:
an optical to electrical converter, the optical to electrical converter configured to:
convert the fringe patterns to electrical signals.

14. The system of claim 13, further comprising:
filtering the electrical signals to maintain lower frequency changes.

15. The system of claim 13, wherein the interrogated fringe patterns are the converted electrical signals.

16. The system of claim 10, wherein the laser source generates a linearly polarized laser beam.

17. The system of claim 10, wherein the laser beam is isolated to minimize phase instabilities in the laser beam.

18. A method comprising:
receiving radio frequency signals for detecting a size of an object;
modulating the radio frequency signals with a laser beam to yield optical signals;
comparing each of the optical signal with at least of one the optical signals to generate fringe patterns;
determining a phase shift between each of the optical signals and the at least one of the optical signals based on the fringe patterns; and
analyzing the fringe patterns to determine the size of the object.

* * * * *